United States Patent Office 3,499,767
Patented Mar. 10, 1970

3,499,767
METHODS OF BINDING LARGE PIECES OF POULTRY
Kermit F. Schlamb, Pittsburgh, Pa., assignor, by mesne assignments, to Calgon Corporation, a corporation of Delaware
No Drawing. Filed Nov. 23, 1966, Ser. No. 596,440
Int. Cl. A23l 1/31
U.S. Cl. 99—107   5 Claims

ABSTRACT OF THE DISCLOSURE

A method is provided for forming large pieces of poultry from small pieces by the steps of breaking the surface cell structure of said small pieces by mechanical action, adding to said surfaces a water soluble molecularly dehydrated phosphate in the presence of sodium chloride, pressing said slashed and coated surfaces together and cooking said poultry flesh to cause coagulation of water soluble proteins.

---

The present invention relates to methods of binding large pieces of poultry and particularly to methods of forming poultry pieces into a single unitary piece of selected shape having the characteristics of a single naturally occurring piece of poultry.

Many attempts have been made to form large pieces of poultry from smaller boned segments. For example, turkey roasts rolled from several smaller pieces and tied with butcher's string have been offered for some time on the market. These "rolled turkey roasts," as they are generally known in the trade, have met with only limited success. The primary problem is that of holding the meat together after cooking. Such roasts when tied and cooked shrink away from the string during cooking and break apart on cutting or handling. As a result it is virtually impossible to carve such a roast or to handle it in the cooked state without it coming apart into pieces representing the original meat pieces. Treatments which improved this situation in the red meats, such as beef, have no effect on poultry. For example, it is known in the butcher trade that slashing or roughing the surfaces of two pieces of beef and then bringing these surfaces together and cooking will improve the resulting "rolled roast" so that it can be sliced or handled without disintegration. This is not true of poultry flesh. All efforts to cause poultry to bind in this manner have led to failure.

In addition, large amounts of water soluble proteins are exuded from the cut surfaces of the poultry and solidify as grey spongy or gelatinous masses on the poultry surfaces to give it an unappetizing and unsightly appearance.

I have found a method of eliminating these problems in the formation of large poultry sections from small pieces of poultry. According to the invention, I am able to form large pieces of poultry from a plurality of pieces of raw poultry meat which are free from the breaking apart of the prior art poultry pieces and in which the problem of water-soluble cook-out is virtually eliminated.

I have discovered that large poultry pieces having the characteristics of a single naturally occurring piece of poultry can be obtained from a multiplicity of smaller pieces by the steps of (1) slashing or working the surfaces to be joined to break the surface cells, (2) adding to said surfaces a small amount of a water soluble molecularly dehydrated phosphate and common salt, a mixture of salts of molecularly dehydrated phosphates and common salt, or a mixture of molecularly dehydrated phosphate and common salt, (3) joining said slashed and coated surfaces together and (4) cooking said poultry flesh. The resulting product is one in which it is easier to separate the meat fibres of the original pieces than to separate the original pieces from one another. The product slices as if it were a solid piece of poultry meat without any cracks or breaks and the unsightly coagulated water soluble proteins characteristic of ordinary cooked poultry was completely absent.

I have found that any of the molecularly dehydrated phosphate salts of sodium potassium or ammonium may be used together with sodium chloride in the practice of the invention. The molecularly dehydrated phosphates may include the pyrophosphates, the orthophosphates, the metaphosphates, tripolyphosphates and combinations thereof. Preferably, I used sodium tripolyphosphate or a mixture of sodium tripolyphosphate and sodium pyrophosphate with added salt. The presence of salt (sodium chloride) is essential to the effectiveness of my invention.

The surfaces may be slashed or worked manually or mechanically to open the surface cells. This may be accomplished by rotary knives or by rotating flexible rods of metal, nylon or other resilient material having sufficient resistance to bending so that, when brushed across the surface of the raw poultry flesh, they cause breaking of the surface cell structure to release soluble heat coagulable proteins.

Preferably the phosphate is added to the raw, slashed poultry flesh as an aqueous slurry with and without salt as indicated, preferably at about 20% solids, although the phosphate may be added in the powdered form or by more or less concentrated slurries.

The practice of my invention can perhaps best be understood by reference to the following examples.

EXAMPLE I

Dark turkey meat was removed from the bones and placed on a traveling belt and passed beneath a rotating reel having fingers adapted to strike and score the upper surface of the meat. After the meat was scored by the fingers it was coated with a 20% slurry of a mixture of 80% sodium tripolyphosphate and 20% sodium pyrophosphate with 15% added salt. The scored treated surfaces were pressed together and the assembled mass cooked. The binding effect and the exudation of soluble protein were noted. The data appears in Table I.

TABLE I.—DATA TURKEY ROASTS

| Treatment | | Meat wt. | Percent Phosphate | Percent Salt | Drained Cooked wt. | Percent Yield | Bind | Exudate |
|---|---|---|---|---|---|---|---|---|
| 1 | Beaten dark meat, variable time | 696 | 0.5 | 1.75 | 507 | 72.84 | Yes | Traces. |
| 2 | do | 803 | 0.5 | 1.75 | 569 | 70.86 | Yes | Do. |
| 3 | do | 719 | | | 461 | 64.12 | No | Much. |
| 4 | do | 627 | 15.7 | | 407 | 65.0 | Some | Do. |
| 5 | do | 714 | | | 419 | 58.8 | No | Do. |
| 6 | do | 587 | | 10.3 | 394 | 67.2 | Yes | Traces. |
| 7 | do | 674 | 16.9 | 11.8 | 483 | 71.6 | Excel | Do. |
| 8 | do | 730 | 18.3 | 12.8 | 539 | 73.8 | Excel | Do. |
| 9 | do | 692 | | | 420 | 60.7 | No | Much. |
| 10 | do | 664 | 16.6 | 11.6 | 491 | 74.0 | Excel | Traces. |
| 11 | do | 849 | | | 548 | 64.6 | No | Much. |
| 12 | do | 782 | | 1.75 | 532 | 68.03 | Part | Do. |

EXAMPLE II

The same tests described in Example I were applied to the white meat of a turkey except the flesh was frozen and the meat then cooked from frozen. The results are tabulated in Table II.

TABLE II

| No. | Meat wt. | 20% slurry | 1.5% salt | Cooked Drained wt. | Percent yield | Bind | Exudate |
|---|---|---|---|---|---|---|---|
| 1 | 1,181 | 26.5 | 15.9 | 957 | 81.04 | Exc | No. |
| 2 | 811 | | 10.4 | 559 | 68.93 | Exc | No. |
| 3 | 1,096 | | | 740 | 67.61 | No | Exudate. |
| 4 | 1,176 | 26.5 | | 869 | 73.90 | Trace | Do. |
| 5 | 607 | | | 403 | 66.39 | | |
| 6 | 644 | 16.1 | 11.27 | 509 | 70.03 | | |
| 7 | 654 | | 13.53 | 461 | 70.50 | | |

While I have illustrated and described a presently preferred embodiment and practice of my invention, it will be understood that this invention may be otherwise embodied within the scope of the following claims.

I claim:
1. A method of forming large pieces of poultry from small pieces comprising the steps of:
    (a) breaking the surface cell structure of said small pieces by mechanical action;
    (b) adding to said surfaces a water soluble molecularly dehydrated phosphate in the presence of sodium chloride sufficient to impart a desired taste;
    (c) pressing said slashed and coated surfaces together; and
    (d) cooking said poultry flesh to cause coagulation of water soluble proteins.
2. The method as claimed in claim 1 wherein the molecularly dehydrated phosphate is sodium tripolyphosphate.
3. The method as claimed in claim 1 wherein the molecularly dehydrated phosphate is a mixture comprising a major portion of sodium tripolyphosphate and a minor portion of another molecularly dehydrated phosphate.
4. The method as claimed in claim 1 wherein the surfaces of the meat are slashed to break the surface cell structure.
5. The method as claimed in claim 1 wherein the surfaces of the meat are beaten to break the surface cell structure.

References Cited

UNITED STATES PATENTS

| 3,032,421 | 5/1962 | Buchholz | 99—107 X |
| 3,285,753 | 11/1966 | Schwall et al. | 99—107 |
| 3,413,127 | 11/1968 | Schwall et al. | 99—107 |

HYMAN LORD, Primary Examiner

U.S. Cl. X.R.

99—159

UNITED STATES PATENT OFFICE
CERTIFICATE OF CORRECTION

Patent No. 3,499,767                                              March 10, 1970

Kermit F. Schlamb

It is certified that error appears in the above identified patent and that said Letters Patent are hereby corrected as shown below:

Columns 3 and 4, TABLE II, column 6, line 6 thereof, "70.03" should read -- 79.03 --.

Signed and sealed this 22nd day of December 1970.

(SEAL)
Attest:

Edward M. Fletcher, Jr.                                WILLIAM E. SCHUYLER, JR.
Attesting Officer                                          Commissioner of Patents